UNITED STATES PATENT OFFICE.

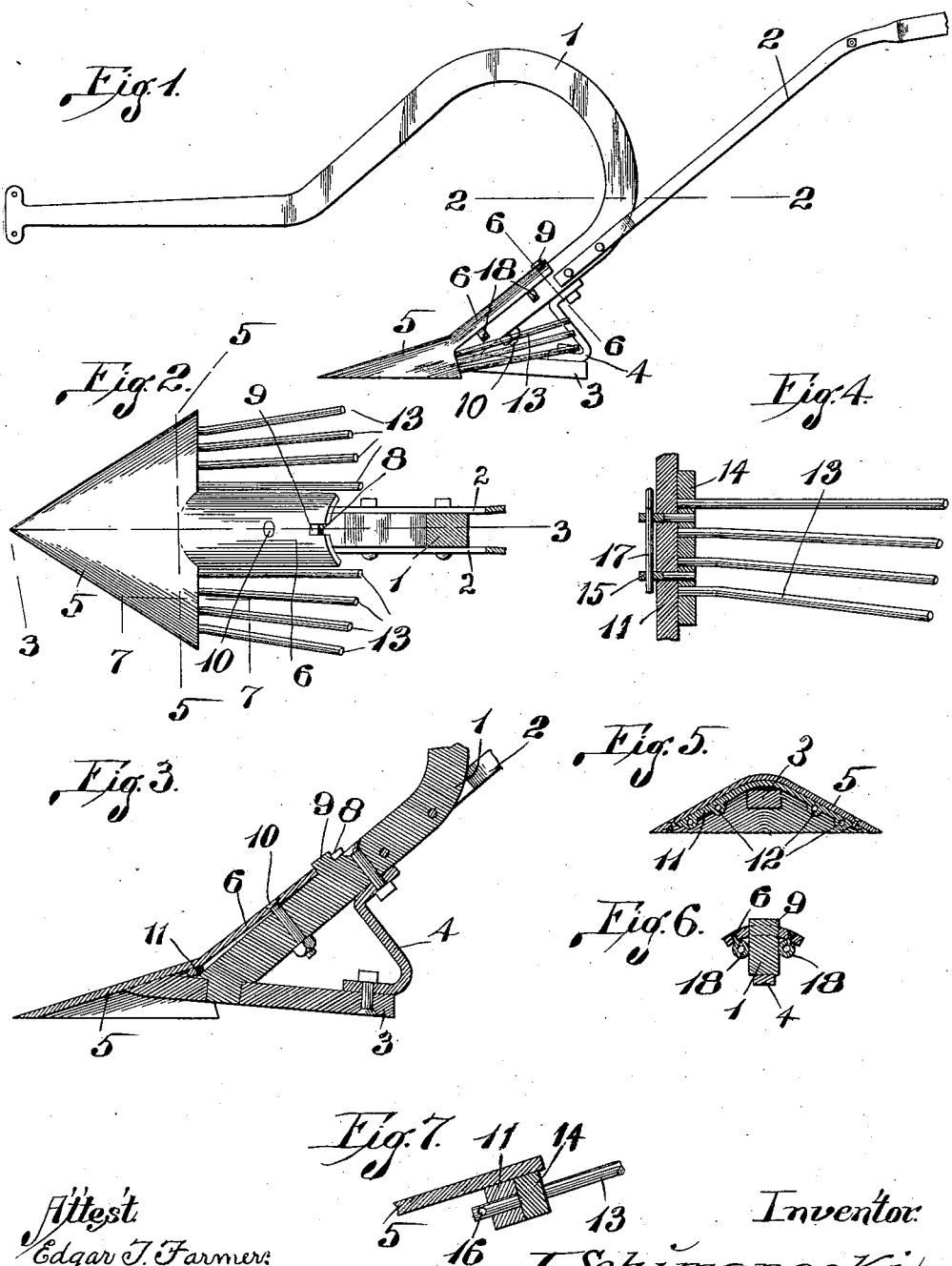

JOSEPH SCHIMANOSKI, OF ST. LOUIS, MISSOURI.

POTATO-DIGGER.

No. 870,320.   Specification of Letters Patent.   Patented Nov. 5, 1907.

Application filed June 10, 1907. Serial No. 378,058.

*To all whom it may concern:*

Be it known that I, JOSEPH SCHIMANOSKI, a citizen of the United States, and a resident of St. Louis, Missouri, have invented certain new and useful Improvements in Potato-Diggers, of which the following is a specification containing a full, clear, and exact description, reference being had to the accompanying drawings, forming a part hereof.

My invention relates to a potato digger, of the type employing a plow carrying a series of rearwardly projecting rods, or fingers, which tend to separate the potatoes from the soil, and the object of my invention is to construct a simple, inexpensive potato digger wherein the plow may be easily and quickly removed from the plow beam, and the series of rods or fingers may be readily removed from the plow.

To the above purposes, my invention consists in certain novel features of construction and arrangement of parts, which will be hereinafter more fully set forth, pointed out in the claims, and illustrated in the accompanying drawings, in which:—

Figure 1 is a side elevation of a potato digger of my improved construction; Fig. 2 is a horizontal section taken on the line 2—2 of Fig. 1; Fig. 3 is a vertical section taken on the line 3—3 of Fig. 2; Fig. 4 is a horizontal section showing the manner in which a series of the rods or fingers are detachably connected to the rear end of the plow; Fig. 5 is a transverse section taken on the line 5—5 of Fig. 2; Fig. 6 is a transverse section taken on the line 6—6 of Fig. 1; Fig. 7 is an enlarged section taken on the line 7—7 of Fig. 2.

Referring by numerals to the accompanying drawings:—1 designates the plow beam, which is of the usual form and construction, and attached thereto in the usual manner are the handles 2.

Rigidly fixed to the lower end of the rear portion of the beam 1 is a horizontally disposed bar 3, and arranged between the rear end thereof and the beam is a brace 4.

5 designates the plow, which is approximately triangular in outline, and which is positioned immediately over the forward end of the bar 3, with the apex or point of the plow projecting forward; and integral with the center of the rear end of this plow is an arm 6, which inclines upwardly and rearwardly, its upper end being provided with a notch 8 which engages a lug 9 formed on or fixed to the plow beam 1.

A bolt 10 passes through the arm 6 and through the plow beam 1, thus rigidly fixing the plow upon the beam.

Formed integral with or fixed to the under side of the plow 5, and a short distance from the rear edge thereof, is a transversely disposed arch plate 11, with the under side of each end of which is formed integral a pair of perforated lugs 12. This arch plate serves as a brace to rigidly support the rear portion of the plow, and at the same time forms a base or seat for the detachable sets of rods or fingers, (hereinafter described.)

A set of the fingers are arranged to the rear of the plow 5, on each side of the arm 6, and each set comprises a series of rods 13, the forward ends of which are rigidly fixed in a block 14, and to said block is fixed a pair of forwardly projecting pins 15, which are adapted to engage through the pair of perforated lugs 12, and the forward ends of said pins are perforated, as designated by 16, in order to receive a key, such as 17, thus detachably connecting each set of fingers to the arch plate 11.

The arch plate 11 is purposely positioned a short distance from the rear edge of the plow 5, in order that the blocks 14 may bear against the under side of the rear edge of said plow, thus forming a very rigid connection between the sets of fingers and said plow.

Rigidly fixed to the under side of the arm 6, adjacent each edge thereof, is a pair of perforated lugs 18, which are for the purpose of receiving detachable mold boards when the sets of fingers are deatched from the plow 5, thus allowing the implement to be used as a cultivator when not in use as a potato digger.

When a potato digger of my improved construction is in use, the soil containing the potatoes is upturned by the plow 5, and, as said plow moves forward, the fingers 13 pass beneath the upturned earth and potatoes; and in so doing said fingers act as a screen to separate the potatoes from the earth, and leave them in position to be readily gathered.

My improved potato digger comprises a minimum number of parts, is easily assembled or taken apart, is light, strong, and durable, and very efficient in use.

I claim:—

1. A potato digger, comprising a plow beam, a plow detachably arranged on said beam, an arm integral with said plow and projecting upwardly on the beam, a pair of perforated lugs carried by each side of the arm, an arch plate rigidly fixed to the under side of the plow adjacent its rear edge, blocks detachably fixed to the side portions of the arch plate, and a series of fingers projecting rearwardly from each block.

2. A potato digger, comprising a plow beam, a plow detachably secured thereto, a transversely disposed arch plate rigidly fixed to the under side and rear portion of the plow, pairs of perforated lugs integral with the arch plate, blocks arranged beneath the rear end of the plow against the arch plate, pins rigidly fixed in said blocks and projecting through the perforated lugs on the arch plate, means whereby said pins are locked to the arch plate, and a series of fingers rigidly fixed to each block and projecting rearwardly therefrom.

In testimony whereof, I have signed my name to this specification, in presence of two subscribing witnesses.

JOSEPH SCHIMANOSKI.

Witnesses:
 M. P. SMITH,
 E. L. WALLACE.